March 23, 1937.     B. G. CARLSON     2,074,828
LEVEL FLIGHT CONTROL FOR AIRPLANES
Filed April 23, 1935
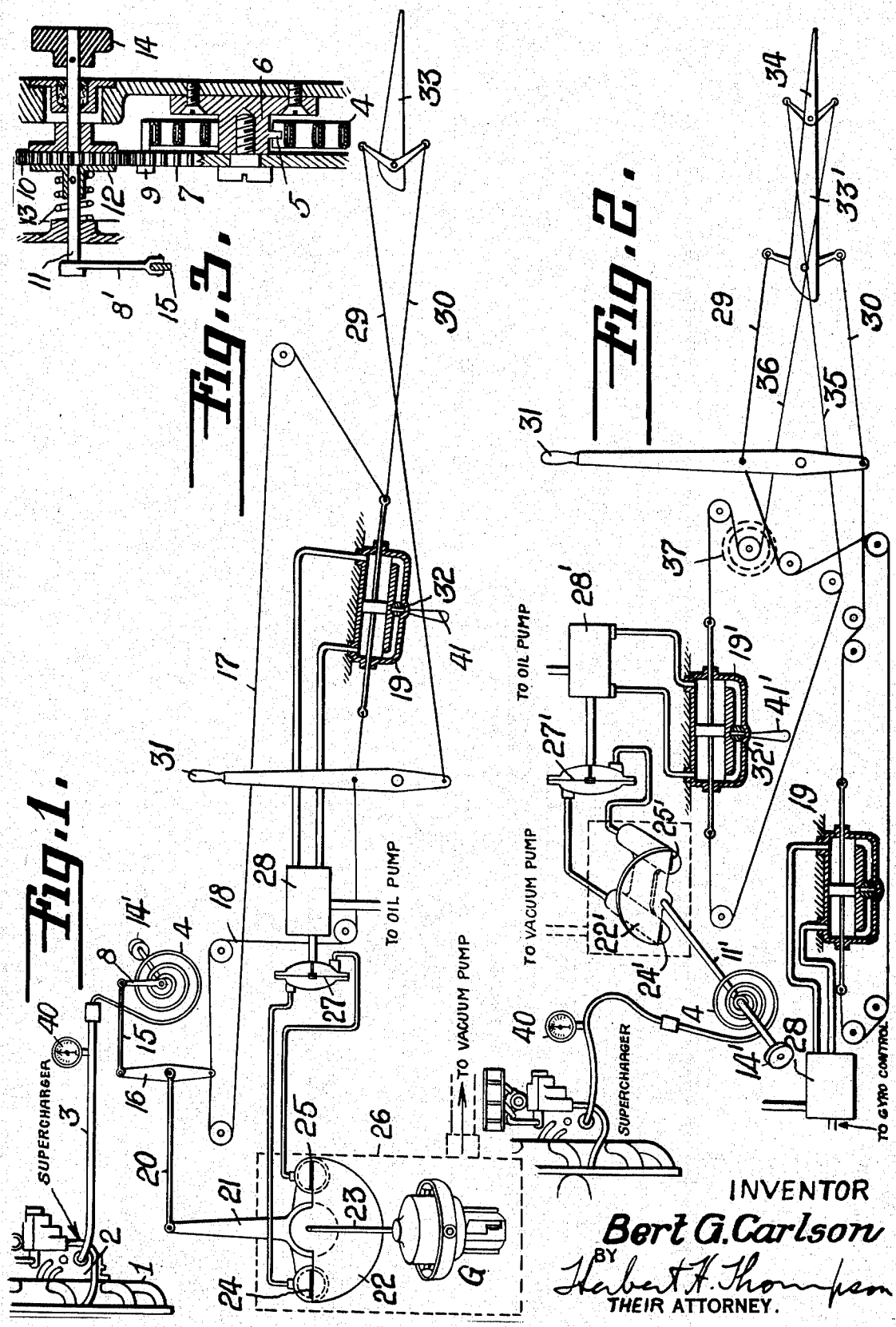
INVENTOR
*Bert G. Carlson*
BY
*Herbert H. Thompson*
THEIR ATTORNEY.

Patented Mar. 23, 1937

2,074,828

UNITED STATES PATENT OFFICE 2,074,828

LEVEL FLIGHT CONTROL FOR AIRPLANES

Bert G. Carlson, Bellerose, N. Y., assignor to Sperry Gyroscope Company, Inc., Brooklyn, N. Y., a corporation of New York Application April 23, 1935, Serial No. 17,772

12 Claims. (Cl. 244—78)

This invention relates to automatic or semi-automatic pilots for aircraft, and especially to the control of the aircraft in elevation. While barometric or height responsive means have been proposed to maintain a constant altitude or level flight, such devices in practice are insensitive and also may result in the controls being placed in an inefficient flying condition. In other words, the automatic pilot with barometric control might be set to prevent an airplane from climbing higher, for instance, when the engine speed was sufficient to cause climbing if the elevator were in its neutral position. This would act as a brake and reduce the flying speed.

According to my invention, I propose to maintain level flight by a device response to the intake manifold pressure on a supercharged airplane engine. It is well known that a super-charged airplane engine operates most efficiently at certain intake pressures and if the intake pressure responsive device is set to that pressure, it will maintain the most efficient flying level, as will be seen from the following brief analysis.

If passengers walk forward in the cabin so as to shift the center of gravity forwardly, normally causing descent, the airplane and engine speed will rise. This will cause a rise in pressure in the intake, and consequently will result in adjustment of the automatic pilot to prevent the descent. Similarly, if the airplane center of gravity shifts rearwardly so as to tend to cause ascent of the plane, the falling off in pressure at the manifold may be made to adjust the automatic pilot to prevent the climb.

My invention is also capable of use in an airplane without an automatic pilot, as by connecting a servomotor responsive to intake manifold pressure directly to the elevator or a part thereof, such as the trim control elevating plane.

Referring to the drawing,

Fig. 1 is a diagrammatic view showing my invention applied to an airplane equipped with an automatic pilot or stabilizer, in elevation.

Fig. 2 is a modified form showing my invention applied to an airplane with or without an automatic pilot.

Fig. 3 is a detail of the preferred construction of intake pressure responsive device.

In Fig. 1 a typical supercharged airplane radial engine is indicated at 1, the intake manifold containing the supercharger being at 2. Tapped into the manifold on the delivery side of the supercharger is a pipe 3 connected with a pressure responsive, hollow expansion coil 4, so that the interior of the coil is connected to the intake manifold pressure and the exterior exposed to the atmosphere or, if desired, placed in a constant pressure casing such as the casing 26 of the gyro pilot itself. One end of said coil is anchored and the other end will therefore rotate in one direction or the other, responsive to changes in manifold pressure. As shown in detail in Fig. 3, the center of the coil is anchored to a pin 5 on a fixed hub 6, while the outer end is secured to a large gear 7 by a pin 9. In the form shown in Fig. 1, the reverse is true, the outer end being fixed and the inner end secured to a lever 8. Gear 7 is shown as driving a gear 10, loosely mounted on shaft 11 but normally clutched thereto by a clutch face 12 pinned to shaft 11 and yieldingly pressed against the face of the gear by a spring 13. To the outer end of the shaft 11 is secured a setting knob 14. By pushing in on the knob, the pressure on the clutch is released so that the knob may turn the shaft 11 freely to initially set the device for level flight at a predetermined engine manifold pressure. Shaft 11 is also shown as operating the lever 8', corresponding to the lever 8 and leading to the elevation control. As shown, lever 8 (or 8') is connected through link 15 to a differential lever or other differential device 16, to the other end of which is connected the follow-up drive cables 17, 18 from the servomotor 19 or elevator 33. The differential movement is transmitted through a link 20 to one of the control members 21 at the gyroscope G, or other gravitational responsive device, which controls the plane in elevation.

The control system shown is of the type described more completely in the patent of M. F. Bates, E. A. Sperry, Jr., and B. G. Carlson, No. 1,992,970, dated March 5, 1935, in which differential air pressure at the gyroscope is utilized to control a hydraulic servomotor. According to this system, a cut-off plate 22 is secured to a trunnion axis 23 of the gyroscope so as to be stabilized thereby, and the cooperating non-stabilized member 21 has mounted thereon a pair of air port members 24 and 25, the whole being enclosed in a casing 26 from which the air is continuously pumped at a rate sufficient to maintain a constant negative pressure differential with said casing. The member 21 is rotatable about an axis in line with trunnion axis 23 by the differential action of the follow-up system (through cables 17 and 18) and applicant's engine pressure responsive device 4, as explained. The difference in pressure drop at the two ports created by the relative inclination of the cut-off plate and ports actuates a flexible diaphragm 27, which operates control valves in a casing 28, controlling the operation of the hydraulic servomotor 19. This motor is shown as connected to the same operating cables 29 and 30 as operated by the hand control device 31, the hydraulic servomotor being bypassed by by-pass valve 32 when not in use.

My invention, as shown in Fig. 2, may be applied to an airplane with or without an automatic pilot arrangement, but equipped with a trim control as well as a service elevating plane. In this instance a rudder control of the Flettner type is shown, the service elevating control surface being at 33' and the Flettner auxiliary or trim surface at 34. According to this form of the invention, I connect the manifold pressure responsive device 4 to operate directly the Flettner or trim rudder through a servomotor of some suitable type. I have shown the same type of servomotor 19' as in Fig. 1, the same being shown as connected through cables 35 and 36 to the trim rudder 34, the hand trim control wheel being indicated at 37 and the regular servomotor at 19 if the plane is equipped with an automatic pilot. In this case, however, the primary differential air pressure control is operated directly from the device 4, the cut-off semicircular disc 22' being shown as connected to be turned by the coil 4 by being mounted on a shaft 11' turned by coil 4.

It will be understood that Fig. 3 illustrates in detail the preferable form of construction of the manifold pressure device for both Figs. 1 and 2, so that in both cases the device may be set by hand differentially without placing tension on the coil. Disc 22' cooperates with differential air ports 24' and 25', fixed adjacent to the disc, and the ports control the diaphragm 27' operating the relay 28, as in the main form of the invention. Where, as shown, the aircraft is equipped with an automatic pilot, my invention is applied thereto without disturbing the standard pilot connections.

My invention has several important operating advantages. It prevents stalling of the airplane in case the engine fails, as at that time the manifold pressure above the atmosphere drops to zero, which will result in setting the elevation controls for a drive. Being responsive to manifold pressure, it accurately controls the same and thus secures the most efficient engine operating conditions. It also maintains level flight and is not unduly sensitive to changes in atmospheric pressure, since in the form shown it is responsive only to differences in manifold and atmospheric pressure. It therefore will maintain the airplane at the altitude desirable for the most economic flying, or where the greatest speed can be obtained, but it is not a barometric or height responsive device since it is not primarily responsive to changes in atmospheric pressure.

In operating an airplane with my invention, the pilot usually takes off with the automatic pilot inoperative, as by opening by-pass valve 32 by handle 41. When he has reached the desired altitude, speed and manifold engine pressure as shown on pressure gauge 40, he sets lever 8' to its zero position by pushing in and turning knob 14 and releasing the same to reengage gear 10 and clutch 12. He then throws the servomotor into operation, and my invention will maintain level flight. The same procedure may be followed with the form of the invention shown in Fig. 2, valve 32' being at first closed until the desired speed, manifold pressure and altitude are reached, and then opened after device 4 has been adjusted to set disc 22' on shaft 10' in its neutral position.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a level flight control for airplanes having an engine and elevator surface, a movable device, the position of which changes with changes of pressure at the intake manifold, and a servomotor connected to operate said surface and controlled at least in part by the position of said device to maintain an efficient flight level at the prevailing engine speed and manifold intake pressure.

2. In a level flight control for airplanes having a supercharged engine and elevator surface, a device responsive to pressure variations at the delivery side of the supercharger, and a servomotor connected to operate said surface and controlled at least in part by said device.

3. In a level flight control for airplanes having an engine and elevator surface, a device responsive to pressure variations at the intake manifold, a gravitationally responsive device for normally maintaining lever flight, and a servomotor connected to operate said surface and differentially controlled by said two devices.

4. In a level flight control for airplanes having an engine and elevator surface, a device responsive to pressure variations at the intake manifold, a servomotor connected to operate said surface and controlled at least in part by said device, and means for altering at will the setting of said device to obtain the desired flight level and speed with neutral elevator.

5. In a level flight control for airplanes having an engine and elevator surface, a device responsive to pressure variations at the intake manifold, a gravitationally responsive device for normally maintaining level flight, a servomotor connected to operate said surface and differentially controlled by said two devices, and means for altering at will the setting of said device to obtain the desired flight level and speed with neutral elevator.

6. The combination with an automatic pilot for aircraft having a gravitationally responsive member for controlling the fore and aft trim, of an auxiliary device for assisting in maintaining level flight and responsive to pressure variations at the engine intake, and means controlled by both said automatic pilot and said device for jointly operating the elevating rudder.

7. In an automatic pilot for aircraft, the combination with a gravitationally responsive means for maintaining level flight and the elevating surface, of a servomotor controlled by said means for operating said surface, a device responsive to pressure variations at the engine intake manifold, and means operated thereby for changing the relation between the aircraft, said gravitational means and the surface for the purpose specified.

8. An auxiliary device for assisting an airplane pilot in maintaining efficient flying conditions, comprising a servomotor for assisting in operating the elevating surface, a source of power for operating said servomotor, and a device the position of which changes with changes of intake pressure at the engine for controlling said servomotor to turn said rudder to cause ascent or descent of the airplane, as required, to maintain said intake pressure constant.

9. An auxiliary device for assisting an airplane pilot in maintaining efficient flying conditions, comprising the combination with the supercharged engine and elevating surface, of a servomotor for assisting in operating the elevating surface, a device responsive to changes of intake pressure at the engine for controlling said servomotor, and means for setting said device to maintain a predetermined pressure after the desired flying conditions have been reached.

10. In an automatic pilot for aircraft, the combination with a service control surface and a servomotor for operating the same, of an auxiliary control surface mounted on the service control surface and an auxiliary servomotor for operating said auxiliary control surface, said automatic pilot operating said first named motor, and an auxiliary level flight control device responsive directly or indirectly to diving and climbing for operating said auxiliary servomotor.

11. In an automatic pilot as claimed in claim 10, wherein the level flight maintaining device includes means responsive to variations in engine speed for causing the auxiliary servomotor to adjust the auxiliary surface to stop descent of the craft upon increase of engine speed and to stop ascent upon decrease in engine speed.

12. In an automatic pilot as claimed in claim 10, wherein the level flight maintaining device includes means for causing said auxiliary servomotor to adjust said auxiliary surface to cause slow descent of the craft upon a fall in pressure at the intake manifold of the engine and to cause slow ascent of the craft upon a rise in such pressure.

BERT G. CARLSON.